US011588643B2

(12) United States Patent
Maniyar et al.

(10) Patent No.: US 11,588,643 B2
(45) Date of Patent: Feb. 21, 2023

(54) BLOCKCHAIN MANAGEMENT SYSTEM

(71) Applicant: PayPal, Inc., San Jose, CA (US)

(72) Inventors: Vidit Maniyar, San Jose, CA (US); Arjun Shukla, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 207 days.

(21) Appl. No.: 16/234,485

(22) Filed: Dec. 27, 2018

(65) Prior Publication Data

US 2020/0213127 A1 Jul. 2, 2020

(51) Int. Cl.
| | |
|---|---|
| G06Q 20/00 | (2012.01) |
| H04L 9/32 | (2006.01) |
| G06F 16/23 | (2019.01) |
| G06Q 20/36 | (2012.01) |
| G06F 16/27 | (2019.01) |

(52) U.S. Cl.
CPC ........ H04L 9/3247 (2013.01); G06F 16/2379 (2019.01); G06F 16/27 (2019.01); G06Q 20/3678 (2013.01); H04L 9/3236 (2013.01); G06Q 2220/00 (2013.01); H04L 2209/56 (2013.01)

(58) Field of Classification Search
CPC . H04L 63/0823; H04L 9/3239; H04L 9/3247; G06Q 20/00
See application file for complete search history.

(56) References Cited

U.S. PATENT DOCUMENTS 9,774,578 B1 9/2017 Ateniese et al.
10,102,526 B1 * 10/2018 Madisetti ............. G06Q 20/065
2015/0262137 A1 9/2015 Armstrong
2015/0332256 A1 11/2015 Minor
2015/0332283 A1 11/2015 Witchey
2017/0031676 A1 2/2017 Cecchetti et al.
2017/0083907 A1 3/2017 McDonough et al.
2017/0331896 A1 11/2017 Holloway et al.
(Continued)

OTHER PUBLICATIONS

Macheel, Tanaya, "PayPal Launches Blockchain-Based Reward System for Employees", retrieved from internet at https://cheddar.com/videos/paypal-launches-employee-experiment-into-blockchain on Dec. 14, 2018, 3 pgs.
(Continued)

*Primary Examiner* — Ojo O Oyebisi

(57) ABSTRACT

According to one or more aspects of the present disclosure, operations may include obtaining a token transaction request of a token transaction that includes a transfer of assignment of a crypto-token of a crypto-medium from a first entity to a second entity. The token transaction request may be a request to initiate the token transaction. The operations may further include generating a transaction signature in response to obtaining the token transaction request. The operations may include validating the token transaction using the digital signature and blocks of a private blockchain that includes a blockchain record of all transactions of the crypto-medium. In these or other embodiments, the operations may include generating a new block for the private blockchain, the new block including an update to the blockchain record that indicates the token transaction details. The generating of the new block may be triggered by the token transaction being validated.

20 Claims, 6 Drawing Sheets

(56) References Cited

U.S. PATENT DOCUMENTS

| | | | |
|---|---|---|---|
| 2019/0146979 A1* | 5/2019 | Madisetti | G06Q 20/389 |
| | | | 707/634 |
| 2019/0327082 A1* | 10/2019 | Ow | H04L 9/0637 |
| 2019/0340607 A1* | 11/2019 | Lynn | G06Q 20/389 |
| 2020/0162324 A1* | 5/2020 | Amburey | H04L 41/0816 |

OTHER PUBLICATIONS

International Search Report and Written Opinion, as issued in connection with International Patent Application No. PCT/US2019/068604, dated Mar. 18, 2020, 11 pgs.

International Application No. PCT/US2019/068604, International Preliminary Report on Patentability dated Jul. 8, 2021, 10 pages.

* cited by examiner

BLOCKCHAIN MANAGEMENT SYSTEM

FIELD

The embodiments discussed in the present disclosure are related to a blockchain management system.

BACKGROUND

Blockchains may be used to store records. In particular, blockchains may include a growing list of blocks of data that are linked using cryptography. For example, in some instances, each block may include a cryptographic hash of one or more previous blocks.

The subject matter claimed in the present disclosure is not limited to embodiments that solve any disadvantages or that operate only in environments such as those described above. Rather, this background is only provided to illustrate one example technology area where some embodiments described herein may be practiced.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
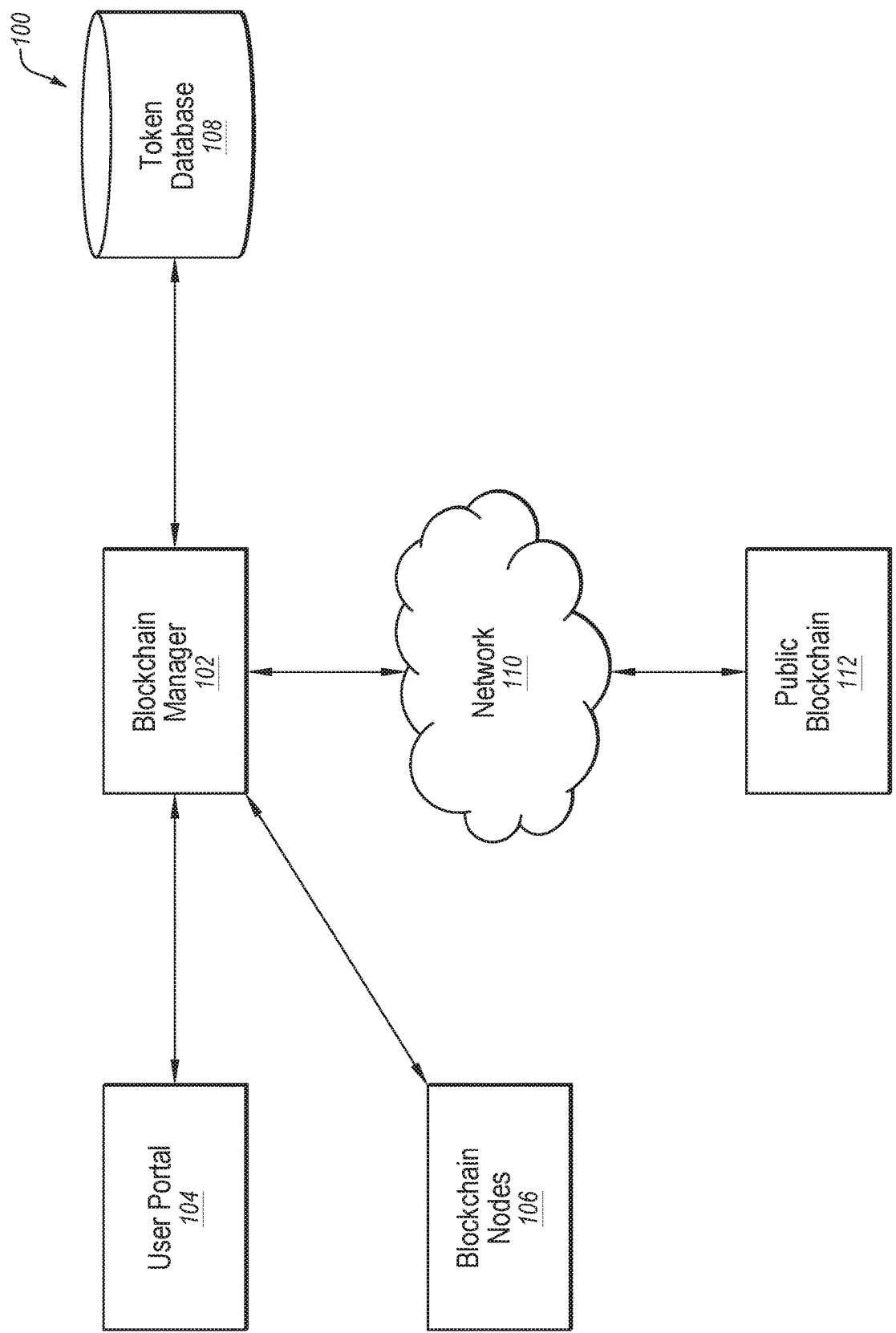
FIG. 1 illustrates an example environment that may be used to maintain a private blockchain.

Blockchain technology is used to create a chain of blocks of data that are linked to each other through cryptographic hashes. For example, in many common implementations of blockchains a particular block may include a cryptographic hash of a previous block. Additionally, blockchain technology may be used to store records of transactions between entities. For example, a block may correspond to one or more transactions and may include transaction data of the respective transactions (e.g., the entities involved, the subject of the transaction, etc.). In some embodiments, the blockchain may be used to track transactions related to a particular crypto-medium that may be used to exchange goods or services. In these or other embodiments, the transaction data may be used to keep track of ownership and exchange of units of the crypto-medium (referred to in the present disclosure as "crypto-tokens").

The use of cryptographic hashes with respect to blocks helps maintain the security of the blockchain. For instance, if a party were to want to change the information included in a particular block, the hash included in each subsequent block would change. As such, in order to change one block, every subsequent block would also need to be changed.

Further, in many instances, blockchains may be maintained by multiple different computing systems (referred to in the present disclosure as "blockchain nodes") that may each maintain a copy of the blockchain. Additionally or alternatively, at least a majority of the blockchain nodes must agree as to the makeup of the blockchain. As such, in order to maliciously change the blockchain, a malicious entity must infiltrate at least a majority of the blockchain nodes that maintain the blockchain, further adding to the security of blockchains.

Further, in these or other instances, with respect to using blockchains to track ownership of crypto-tokens, each time a transaction is added to the blockchain, at least a majority of the blockchain nodes must verify the validity of the transaction by referring to transaction data included in previous blocks. The verification may include making sure the entity transferring the crypto-tokens in fact is the owner of the crypt-tokens to be transferred.

The present disclosure relates to methods and systems that may be used to maintain a private blockchain. The private blockchain may be created by a system of a master entity to generate a crypto-medium that may be distributed in the form of crypto-tokens. In some embodiments, the crypto-tokens may be distributed to associate entities that may be associated with the master entity. Further, in some embodiments, the crypto-tokens may be exchanged between associate entities. The methods and systems described in the present disclosure may provide the framework configured to maintain the private blockchain. The framework may also be configured to provide a mechanism that allows for the distribution of the crypto-tokens by the master entity. In these or other embodiments, the framework may be configured to provide a mechanism that allows for the exchange of the crypto-tokens between associate entities.

In these or other embodiments, the systems and methods described herein may include creation of the blocks of the private blockchain in a manner that reduces computational resources as compared to creation blocks for public blockchain systems, as discussed in further detail below. In these or other embodiments, the present disclosure may relate to one or more systems and methods configured to address one or more security vulnerabilities of private blockchains in general to help maintain the integrity of the private blockchain such that a malicious attack on the private blockchain may be less effective.

As such, the systems and methods described in the present disclosure may help improve the implementation of private blockchains, which may have advantages over public blockchains. For example, the methods and systems of the present disclosure may provide for private blockchains that may be faster than public blockchains and may also improve trust, reliability, security, and maintainability of the private blockchains. Further, the private nature of the private blockchain may be leveraged to be able to use blockchain technology to monitor and maintain private information. In contrast, if such information were stored on a public blockchain, it may be exposed publicly.

FIG. 1 illustrates an example blockchain management system 100 that may be used to maintain a private blockchain. The blockchain management system 100 may be arranged according to one or more embodiments of the present disclosure. As detailed below, the blockchain management system 100 may include a blockchain manager 102, a user portal 104, a group of blockchain nodes 106, a token database 108, a network 110, and a public blockchain 112. In general, the user portal 104, the blockchain manager 102, the token database 108, and the blockchain nodes 106 may be maintained by a master entity and may be configured to implement, manage, and maintain a private blockchain that may be associated with the master entity. In some embodiments, the private blockchain may be linked to a crypto-medium in that the private block chain may include a blockchain record used to record and track transactions related to crypto-tokens of the crypto-medium. In some embodiments, the crypto-medium may be created and controlled by the master entity through the implementation of one or more of the blockchain manager 102, the user portal 104, and the blockchain nodes 106. In these or other embodiments, the crypto-medium may operate as a virtual currency that may be used for the exchange of goods or services. In these or other embodiments, the crypto-tokens may operate as "coins" of the crypto-medium and may be exchanged as part of transactions.

In some embodiments, the user portal 104 may be implemented using software that includes code and routines configured to enable a computing system to perform operations. Additionally or alternatively, the user portal 104 may be implemented using hardware including a processor, a microprocessor (e.g., to perform or control performance of one or more operations), a field-programmable gate array (FPGA), or an application-specific integrated circuit (ASIC). In some other instances, the user portal 104 may be implemented using a combination of hardware and software. In the present disclosure, operations described as being performed by the user portal 104 may include operations that the user portal 104 may direct a computing system to perform.

In some embodiments, the user portal 104 may be configured to generate a user interface that may be presented to a user via an electronic device. For instance, the user interface may include a graphical user interface that may include one or more widgets that may present information and that may be configured to receive commands or information.

In some embodiments, the user may be an associate entity who may be associated with the master entity and the user interface may be configured to allow the associate entity to perform actions that may relate to the crypto-token. For example, in some instances, the associate entity may be an employee of the master entity and the master entity may have an incentive program to encourage associate entities to perform certain tasks. For instance, the incentive program may be to promote innovation and the user portal 104 may be configured to generate a user interface that allows the associate entities to submit ideas that may be implemented by the master entity, patent ideas, etc. In these or other embodiments, the master entity may reward crypto-tokens to associate entities whose ideas are accepted. In these or other embodiments, the user portal 104 may be configured to communicate approval of a particular idea of a particular associate entity to the blockchain manager 102. As detailed below, in response to receiving approval of the particular idea, the blockchain manager 102 may be configured to control the performance of one or more operations related to assigning one or more crypto-tokens from the master entity to the particular associate entity.

In some embodiments, the user portal 104 may be configured to generate a user interface that allows the associate entities to purchase the goods or services using the crypto-tokens. In these or other embodiments, the user portal 104 may be configured to communicate an indication of the purchase to the blockchain manager 102. As detailed below, in response to receiving the purchase indication, the blockchain manager 102 may be configured to control the performance of one or more operations related to assigning one or more crypto-tokens from the associate entity who initiates the purchase to the master entity.

In these or other embodiments, the user portal 104 may be configured to generate a user interface that allows the associate entities to exchange crypto-tokens between each other. In these or other embodiments, the user portal 104 may be configured to communicate an indication of an exchange to the blockchain manager 102. As detailed below, in response to receiving the exchange indication, the blockchain manager 102 may be configured to control the performance of one or more operations related to assigning one or more crypto-tokens from the assigning associate entity to the receiving associate entity.

In some embodiments, the user portal 104 may be configured to interface with any suitable electronic device that may be used by an associated entity. For example, the user portal 104 may be configured to interface with a desktop computer, a laptop computer, a smartphone, a mobile phone, a tablet computer, etc. In some embodiments, the user portal 104 may be configured to provide the user interface to a particular electronic device in response to a particular associate entity logging into an account associated with the master entity. In these or other embodiments, the logging in may be performed using a browser, a native application developed by the master entity or any other suitable mechanism.

The token database 108 may include any suitable configuration of computer-readable media configured to store data in a particular manner. In some embodiments, the token database 108 may store data related to the crypto-medium. For instance, the token database 108 may include a database record that may be configured to store a backup of the blockchain record that may be stored on the private blockchain as described in further detail below. As such, the database record may store information related to transactions of crypto-tokens between entities.

In these or other embodiments, the database record may include additional information than that included in the blockchain record. For example, the additional information may provide context regarding the transactions. For instance, a transfer of assignment of a crypto-token from the master entity to a particular associate entity may be in response to the particular associate entity satisfying a particular incentive. As another example, a transfer of assignment of the crypto-token from the particular associate entity to the master entity may be in response to the particular associate entity purchasing a good or service from the master entity. As another example, a transfer of assignment of the crypto-token from the particular associate entity to another associate entity may be in response to the particular associate entity purchasing a good or service from the other associate entity. In these or other embodiments, the database record may include an indication of the transfers as included in the blockchain record of the private blockchain as well as an indication as to the reasons for the transactions, the subject of the transactions (e.g., goods or services exchanged), etc.

In these or other embodiments, the token database 108 may include a master wallet of the master entity. The master wallet may include a balance of crypto-tokens that may be owned by the master entity. Additionally or alternatively, the master wallet may include a master private key and a corresponding master public key. The master private key and the master public key may be a cryptographic public key/private key pair in which data may be encrypted using the master private key (also referred to as being "signed") and decrypted using the master public key or vice versa. As discussed in further detail below, the master private key and the master public key may be used to transfer and validate assignment of crypto-tokens from the master entity to the associate entities. In the present disclosure, the use of the terms "master private key" and "master public key" are to indicate that the corresponding keys are assigned to the master entity. The use of the term "master" does not necessarily mean that the corresponding keys are universal keys that may be used to decrypt data that has been encrypted using other keys.

Additionally or alternatively, the token database 108 may include multiple associate wallets in which each associate wallet corresponds to a respective associate entity. Each associate wallet may include a balance of crypto-tokens that may be owned by the respective associate entity. In these or other embodiments, each associate wallet may include an associate private key/associate public key pair that may be a cryptographic public key/private key pair like the master private key and the master public key. Further, similar to the master private key and the master public key, as discussed in further detail below, the associate private keys and the associate public keys may be used to transfer and validate assignment of crypto-keys from the corresponding associate entities.

The blockchain nodes 106 may be a group of multiple computing systems that are configured to maintain the private blockchain. For example, in some embodiments, one or more of the blockchain nodes 106 may be configured to initialize the private blockchain by generating the first block of the blockchain. The initialization of the private blockchain is discussed in further detail below. Additionally, in some embodiments, each blockchain node 106 may maintain the private blockchain by including stored thereon a copy of the private blockchain. Further, each blockchain node 106 may be configured to validate transactions using the private blockchain, as discussed in further detail below. In these or other embodiments, one or more of the blockchain nodes 106 may be configured to generate a new block for the private blockchain for a new transaction in response to validation of the new transaction. The validation of transactions and creation of new blocks is discussed in further detail below.

In some embodiments, the blockchain nodes 106 may be maintained by the master entity, which may expose the private blockchain to security risks that may be less prevalent than with public blockchains that include nodes that may be maintained by different entities. Therefore, in some embodiments, the blockchain nodes 106 may be linked in a distributed manner that may make it difficult for a malicious entity to gain access to a majority of the blockchain nodes 106 at a time. Additionally, as discussed in further detail below, in some embodiments the public blockchain 112 may be used to help reduce security risks of the blockchain nodes 106 being maintained by the same entity.

The blockchain manager 102 may be implemented using software that includes code and routines configured to enable a computing system to perform operations. Additionally or alternatively, the blockchain manager 102 may be implemented using hardware including a processor, a microprocessor (e.g., to perform or control performance of one or more operations), a field-programmable gate array (FPGA), or an application-specific integrated circuit (ASIC). In some other instances, the blockchain manager 102 may be implemented using a combination of hardware and software. In the present disclosure, operations described as being performed by the blockchain manager 102 may include operations that the blockchain manager 102 may direct a computing system to perform.

The blockchain manager 102 may be configured to provide a mechanism for the interaction between all the different elements of the blockchain management system 100. As detailed below, in these or other embodiments, the blockchain manager 102 may be configured to coordinate and direct operations related to any combination of one or more of the following: initialization of the private blockchain, assignment of crypto-tokens between entities, validation of the private blockchain, reconstruction of at least a portion of the database record, and reconstruction of at least a portion of the blockchain record.

For example, as detailed below with respect to FIG. 2, in some embodiments the blockchain manager 102 may be configured to coordinate and direct operations between the token database 108 and the blockchain nodes 106 with respect to the initialization of the private blockchain. In these or other embodiments, as detailed below with respect to FIG. 3, in some embodiments the blockchain manager 102 may be configured to coordinate and direct operations between the user portal 104, the token database 108, and the blockchain nodes 106 with respect to the assignment of crypto-tokens between entities. Additionally or alternatively, as detailed below with respect to FIG. 4, in some embodiments the blockchain manager 102 may be configured to coordinate and direct operations between the public blockchain 112, the network 110, the token database 108, and the blockchain nodes 106 with respect to validation of the private blockchain. Additionally or alternatively, as detailed below with respect to FIG. 3, the blockchain manager 102 may be configured to coordinate and direct operations between the token database 108 and the blockchain nodes 106 with respect to reconstructing at least a portion of the blockchain record using the database record (e.g., in instances in which the blockchain record becomes corrupted). In these or other embodiments, as detailed below with respect to FIG. 3, the blockchain manager 102 may be configured to coordinate and direct operations between the token database 108 and the blockchain nodes 106 with respect to reconstructing at least a portion of data stored on the token database 108 using the blockchain record (e.g., in instances in which the database record becomes corrupted).

In some embodiments, to handle the coordination and direction of operations, the blockchain manager 102 may be configured to operate according to the different platforms of the different components of the blockchain management system 100. For example, the user portal 104 may operate using a first platform that may include a first type of software and/or hardware and corresponding first communication protocols used to interface with the first platform. In these or other embodiments, the blockchain manager 102 may be configured based on the first platform to allow the blockchain manager 102 to interface and interact with the user portal. For instance, in some embodiments, the blockchain manager 102 may include a first Application Program Interface (API) that is configured according to the first platform such that the blockchain manager 102 is able to receive and/or send data and/or commands to and from the user portal 104.

As another example, the token database 108 may operate using a second platform and the blockchain manager 102 may include a second API configured to interface with the second platform in a similar manner to allow the blockchain manager 102 to interact with the token database 108. In these or other embodiments, the public blockchain 112 may operate using a third platform and the blockchain manager 102 may include a third API configured to interface with the third platform in a similar manner to allow the blockchain manager 102 to interact with the public blockchain 112. In these or other embodiments, the API's of the blockchain manager 102 may be configured to interface with each other such that data and/or commands may be exchanged between the different APIs.

In general the network 110 may be configured to communicatively couple systems and devices such as blockchain manager 102 and the public blockchain 112. In some embodiments, the network 110 may include a short-range wireless network, such as a wireless local area network (WLAN), a personal area network (PAN), or a wireless mesh network (WMN). For example, the network 110 may include networks that use Bluetooth® Class 2 and Class 3 communications with protocols that are managed by the Bluetooth® Special Interest Group (SIG). Other examples of wireless networks may include the IEEE 802.11 networks (commonly referred to as WiFi), Zigbee networks, among other types of LANS, PANS, and WMNS. In these or other embodiments, the network 110 may include a wide area network (WAN) that may extend over a relatively large geographical area as compared to the geographical area that may be covered by a short-range wireless network. In some embodiments, the network 110 may have numerous different configurations. In some embodiments, the network 110 may include a peer-to-peer network. Additionally or alternatively, the network 110 may also be coupled to or may include portions of a telecommunications network for sending data in a variety of different communication protocols. In some embodiments, the network 110 may include an Internet Protocol (IP) based network such as the Internet. In some embodiments, the network 110 may include cellular communication networks for sending and receiving communications and/or data including via hypertext transfer protocol (HTTP), direct data connection, wireless application protocol (WAP), etc. The network 110 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. Although not explicitly illustrated, in some embodiments, the blockchain manager 102 may communicate with one or more of the user portal 104, the token database 108 and the blockchain nodes 106 via the network 110 or any other suitable local and/or wide area network.

The public blockchain 112 may include any suitable configuration or organization of computing systems configured to maintain a public blockchain. For example the public blockchain 112 may be the Ethereum blockchain and may include those computing systems that operate as miners for the Ethereum blockchain. As detailed below with respect to FIG. 4 and indicated above, in some embodiments, the blockchain manager 102 may be configured to interface with the public blockchain 112 and the blockchain nodes 106 to validate the private blockchain using the public blockchain 112. In the present disclosure, reference to the public blockchain 112 may include the actual blockchain of data and/or one or more of the computing systems that maintain the corresponding blockchain.

Modifications, additions, or omissions may be made to FIG. 1 without departing from the scope of the present disclosure. For example, the blockchain management system 100 may include more or fewer elements than those illustrated and described in the present disclosure. In addition, in some embodiments, one or more routines, or at least a portion of the user portal 104, the blockchain manager 102, the token database, or the blockchain nodes 106 may be combined such that they may be considered the same element or may have common sections that may be considered part of two or more of the user portal 104, the blockchain manager 102, the token database, or the blockchain nodes 106.

Figure 2:
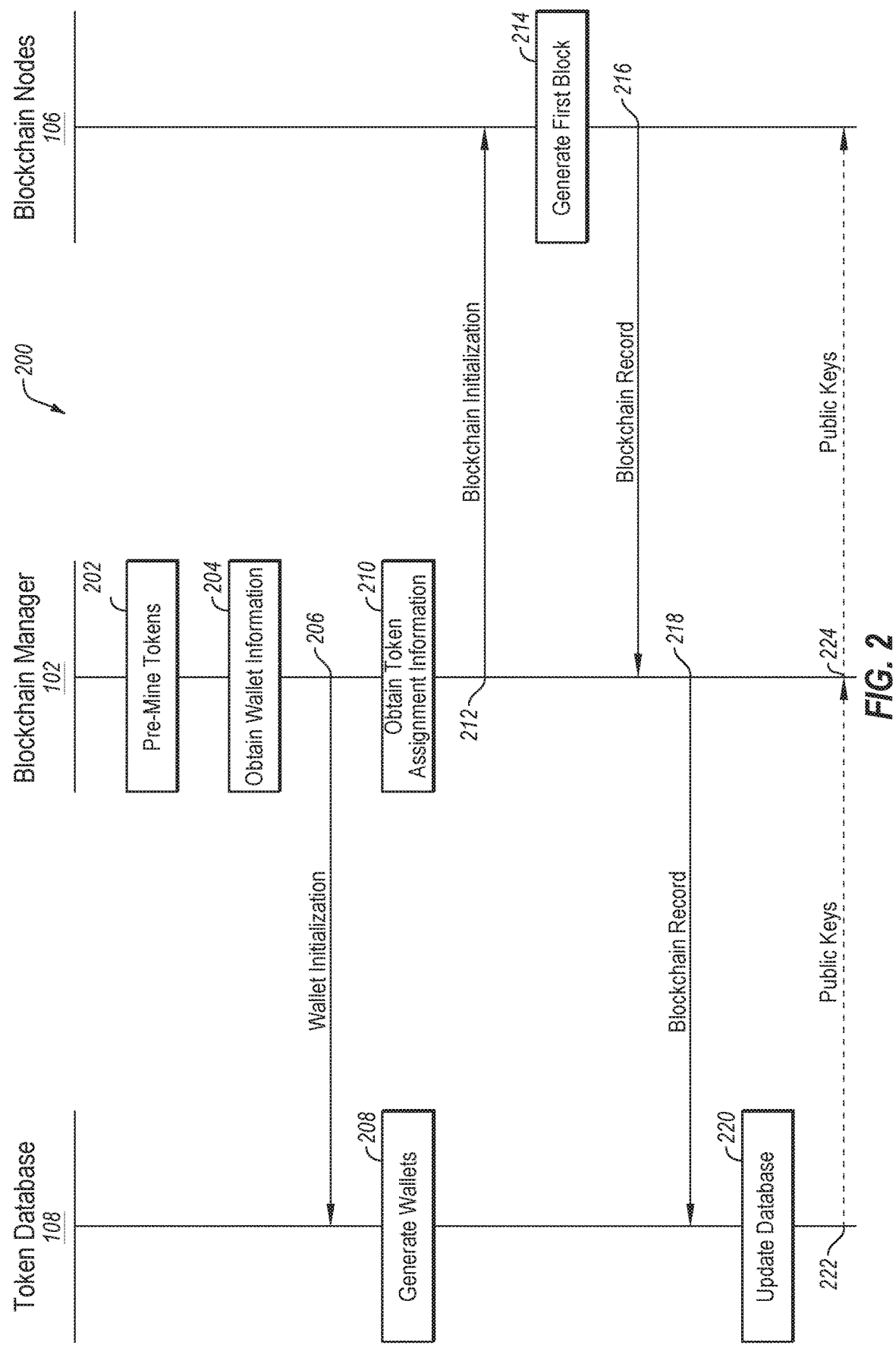
FIG. 2 illustrates example operations related to the initialization of a private blockchain.

FIG. 2 illustrates example operations 200 related to the initialization of a private blockchain that may be used to generate a crypto-medium and corresponding crypto-tokens and track transactions related thereto. The operations 200 may be arranged in accordance with at least one embodiment described in the present disclosure. In the illustrated example, the operations 200 may be between the blockchain manager 102, the token database 108, and the blockchain nodes 106 of FIG. 1. In some embodiments, the operations 200 may be an example of communications and interactions between the blockchain manager 102, the token database 108, and the blockchain nodes 106. The operations 200 illustrated are not exhaustive but are merely representative of operations that may occur. Furthermore, one operation as illustrated may represent one or more communications, operations, and/or data exchanges. In addition, the components or elements described as performing a specific operation may vary depending on particular implementations.

At operation 202, the crypto-tokens of the crypto-medium may be pre-mined. In the example of FIG. 2, the pre-mining may be performed by the blockchain manager 102. In some embodiments, the pre-mining of the crypto-tokens may include establishing a number of crypto-tokens that may be available for distribution. In these or other embodiments, the pre-mining may include establishing that all of the crypto-tokens are available for distribution upon initialization of the private blockchain. In contrast, many public blockchains stagger the creation of crypto-tokens over the course of a period of time to provide incentives for validation of transactions, as discussed in further detail below. However, as also discussed below, the staggered mining of tokens in public blockchains may result in slower transaction validation and settlement as opposed to the pre-mining of the present disclosure. In the present disclosure reference to "distribution" of crypto-tokens may refer to assignment of the crypto-tokens from one entity to another as the crypto-tokens themselves are not physical tokens. Additionally, distribution of crypto-tokens may include the distribution of fractions of the crypto-tokens.

In some embodiments, the pre-mining of the crypto-tokens may include setting one or more conditions of use for the crypto-tokens. For example, the conditions may dictate the number of crypto-tokens to be created. In these or other embodiments, the conditions of use may include one or more output operations that may be performed in response to one or more input conditions being met. For example, the conditions of use may dictate that the crypto-tokens may only be exchanged in response to certain input conditions being met, etc. As another example, the conditions of use may include destroying or "burning" one or more crypto-tokens in response to one or more particular input conditions being met.

In some embodiments, one or more smart contracts may be generated with respect to setting the conditions. For example, the smart contracts may include one or more software routines configured to receive as input, one or more input conditions related to the crypto-tokens and configured to perform output operations with respect to the crypto-tokens based on the state of the input conditions.

At operation 204, wallet information related to wallets that are associated with the crypto-medium may be obtained. In the example of FIG. 2, the blockchain manager 102 may obtain the wallet information. The wallet information may include obtaining identities of which entities may have wallets and assignment of the respective wallets. For instance, the wallet information may indicate that the master entity may have a master wallet. Additionally or alternatively, the wallet information may include the identities of which associate entities may have wallets. In these or other embodiments, the wallet information may indicate assignment of an associate wallet to each respective associate entity.

In some embodiments, the obtaining of the wallet information may include obtaining the private key/public key cryptographic pair for each wallet. In some embodiments, the pairs may be generated by the blockchain manager 102. Additionally or alternatively, the blockchain manager 102 may obtain the cryptographic pairs from another system. In these or other embodiments, each cryptographic pair may be assigned to a respective wallet.

At operation 206, the blockchain manager 102 may communicate a wallet initialization command to the token database 108. The wallet initialization command may include the wallet information obtained at operation 204. In some embodiments, the wallet initialization command may direct that the token database 108 create a storage location for each wallet and that each wallet be stored in association with a respective entity and corresponding identity of the respective entity. Additionally or alternatively, the wallet initialization command may direct that the token database 108 store each assigned cryptographic pair in association with the corresponding wallets and entities.

At operation 208, the token database 108 may generate the wallets based on the wallet initialization command. For example, the token database 108 may create a particular storage location for the master wallet and may store the master private key and the master public key at the particular storage location. In these or other embodiments, the token database 108 may store a master identifier that identifies the master entity in association with the particular storage location such that the particular storage location is identified as the master wallet. The token database 108 may perform similar operations to create an associate wallet for each of the associate entities identified in the wallet information.

In some embodiments, the wallet generation may include setting an initial token balance for each wallet that may indicate how much of the crypto-medium may be owned by each respective entity. For example, prior to creation of a block or any initial assignment of crypto-tokens to any particular entity, the token balance for each wallet may be zero.

At operation 210, token assignment information may be obtained. In the illustrated example of FIG. 2, the blockchain manager 102 may obtain the token assignment information. The token assignment information may indicate which entities may have the pre-mined crypto-tokens assigned to them at initialization of the private blockchain. In some embodiments, upon initialization of the private blockchain, every crypto-token may be assigned to the master entity, as indicated in the token assignment information. In some embodiments, the smart contract that may be used to pre-mine the crypto-tokens may indicate the initial assignment of the crypto-tokens.

At operation 212, the blockchain manager 102 may communicate a blockchain initialization command to the blockchain nodes 106. The blockchain initialization command may direct the blockchain nodes 106 to create the first block of the private blockchain. In some embodiments, the blockchain initialization command may include the token assignment information indicating the initial assignment of ownership of the crypto-tokens.

At operation 214, one or more of the blockchain nodes 106 may generate the first block of the private blockchain in response to and based on the blockchain initialization command. For example, a particular blockchain node 106 may generate the first block as a data entry of the blockchain record based on the token assignment information included in the blockchain initialization command. For instance, the first block may include, as the first entry of the blockchain record, data indicating the number of crypto-tokens that are initially assigned to the master entity. As indicated above, the number of crypto-tokens that may be initially assigned to the master entity may be all of the crypto-tokens. In these or other embodiments, the first block may include other data such as a timestamp indicating when the first block was created.

In some embodiments, the first block may be distributed by the particular blockchain node 106 that creates the first block to one or more other blockchain nodes 106 for storage on each of the other blockchain nodes 106. In some embodiments, the particular blockchain node 106 may distribute the first block to every one of the blockchain nodes 106 for storage thereon. In some, the particular blockchain node 106 may apply a hash function to the first block to generate a hash of the first block that may represent the information included in the first block. In these or other embodiments, the particular blockchain node 106 may distribute the hash of the first block to the other blockchain nodes 106. Additionally or alternatively, each of the blockchain nodes 106 may generate the hash.

In some embodiments, at operation 216, the blockchain record as included in the first block may be communicated from one or more of the blockchain nodes 106 to the blockchain manager 102. In these or other embodiments, the hash of the first block may be communicated to the blockchain manager 102.

At operation 218, the blockchain manager 102 may be configured to communicate the received blockchain record to the token database 108. Additionally or alternatively, the blockchain manager 102 may communicate the hash of the first block at operation 218.

At operation 220, the token database 108 may be updated in response to receiving the blockchain record. For example, the database record stored on the token database 108 may be initialized based on the blockchain record to indicate that all the crypto-tokens are initially assigned to the master entity. In these or other embodiments, the database record may include when the first block was generated. Additionally or alternatively, the database record may include an indication that the crypto-tokens were all assigned to the master entity as part of the initialization of the private blockchain. In these or other embodiments, the master wallet may be updated based on the blockchain record to indicate the number of pre-mined crypto-tokens that are assigned to the master entity.

Modifications, additions, or omissions may be made to the operations 200 without departing from the scope of the present disclosure. For example, in some embodiments, the operations 200 may be arranged in a different order or performed at the same time. For instance, one or more of the operations 202, 204, 206, 208, 210, 212, and 214 may be performed at the same time or in a different order than described.

In addition, one or more operations may be performed by different components than as described. For example, in some embodiments, the token database 108 instead of the blockchain manager 102 may perform one or more of the operations 202 and 204. Additionally or alternatively, one or more of the blockchain nodes 106 may perform operation 210 instead of the blockchain manager 102 in some embodiments.

In these or other embodiments, the operations 200 may include one or more additional operations. For instance, in some embodiments, the operations 200 may include operation 222 at which the token database 108 may communicate the public keys of the entities to the blockchain manager 102. In these or other embodiments, the operations 200 may include operation 224 at which the blockchain manager 102 may communicate the public keys to the blockchain nodes 106. As discussed in further detail below, the public keys may be used to validate transfers of crypto-tokens as part of transactions.

Figure 3:
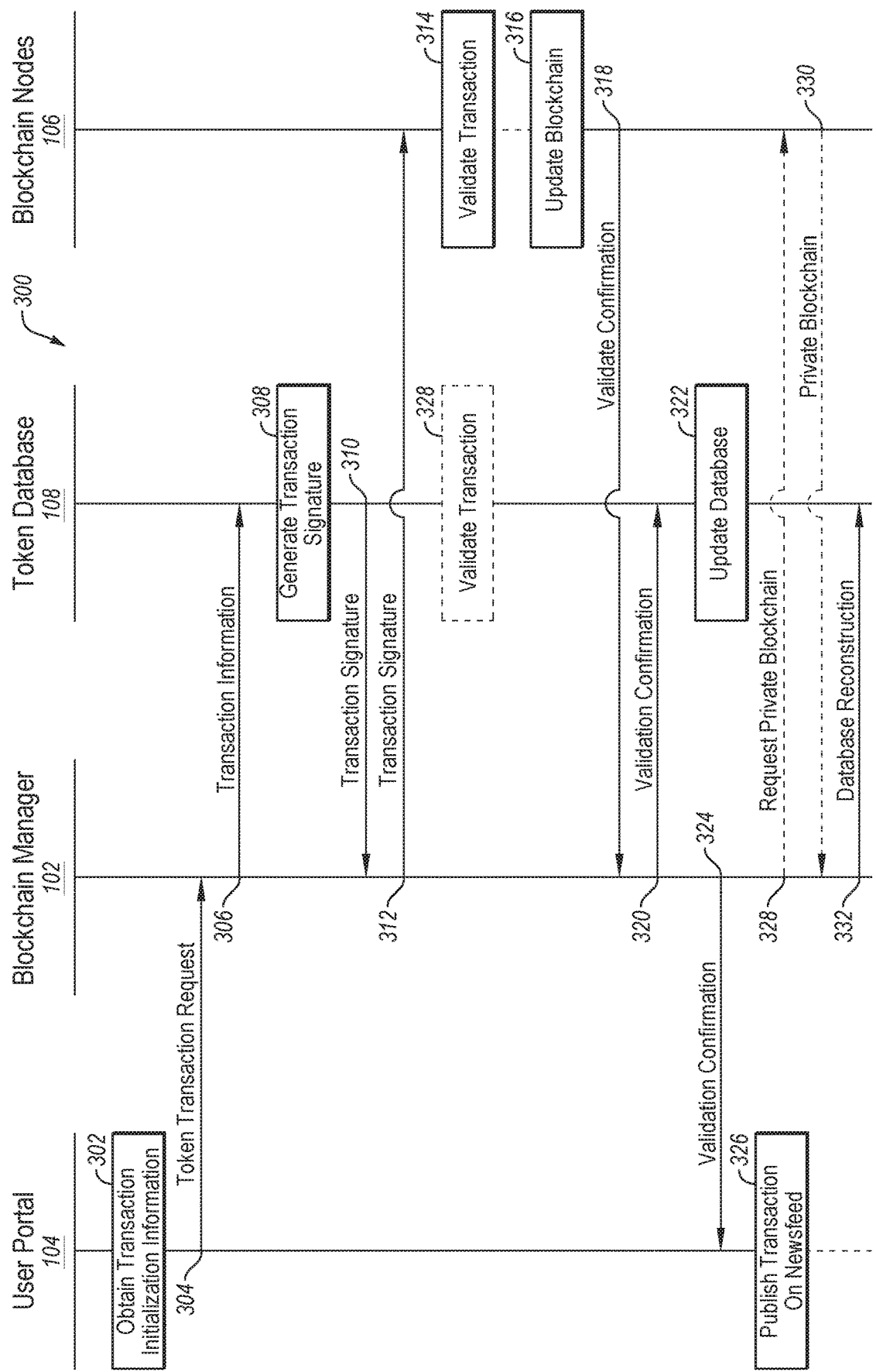
FIG. 3 illustrates example operations related to the transfer of crypto-tokens between entities.

FIG. 3 illustrates example operations 300 related to the transfer of crypto-tokens between entities. The operations 300 may be arranged in accordance with at least one embodiment described in the present disclosure. In the illustrated example, the operations 300 may be between the blockchain manager 102, the user portal 104, the token database 108, and the blockchain nodes 106 of FIG. 1. In some embodiments, the operations 300 may be an example of communications and interactions between the blockchain manager 102, the user portal 104, the token database 108, and the blockchain nodes 106. The operations 300 illustrated are not exhaustive but are merely representative of operations that may occur. Furthermore, one operation as illustrated may represent one or more communications, operations, and/or data exchanges. In addition, the components or elements described as performing a specific operation may vary depending on particular implementations.

At operation 302, the user portal 104 may obtain transaction initialization information. The transaction initialization information may include any information that may be submitted by a user (e.g., an associate entity) that may result in an exchange of crypto-tokens. For example, in some instances, the transaction initialization information may include submission of information related to an incentive program. For instance, the incentive program may relate to submission of patent ideas and the transaction initialization information may include a patent idea of the user. As another example, the transaction initialization information may include an indication by the user to purchase a good or service with crypto-tokens owned by the user. As another example, the transaction initialization information may include an indication by the user to transfer crypto-token ownership to another user.

The user portal 104 may obtain the transaction initialization information in any suitable manner. For example, in some embodiments, the user portal 104 may generate a graphical user interface that may be presented to the user. The graphical user interface may include fields that allow the user to enter the transaction initialization information for reception and processing by the user portal 104.

At operation 304, based on the transaction initialization information, the user portal 104 may communicate a token transaction request to the blockchain manager 102. For example, in response to an incentive requirement of the incentive program being satisfied (e.g., a patent idea being accepted) by submission of the transaction initialization information, the user portal 104 may communicate the token transaction request to the blockchain manager 102. As another example, in response to receiving an indication to make a purchase, as included in the transaction initialization information, the user portal 104 may communicate the token transaction request to the blockchain manager 102. As another example, in response to receiving an indication to transfer crypto-token ownership to another user, as included in the transaction initialization information, the user portal 104 may communicate the token transaction request to the blockchain manager 102.

In some embodiments, the token transaction request may include information related to the transaction ("transaction information"). For example, the transaction information included in the token transaction request may indicate the parties involved in the transaction, the amount of crypto-tokens exchanged in the transaction, goods or services involved in the transaction and/or the purpose of the transaction. In these or other embodiments, the user portal 104 may be configured to verify the identity of the entity that initiates the token transaction request using any suitable technique. For example, the transaction initialization information may be received by the user portal 104 via an account of the entity accessed through a secure login of the entity. In these or other embodiments, the user portal 104 may securely communicate the transaction information (e.g., through any suitable encryption) to help maintain the integrity of the transaction information.

At operation 306, the blockchain manager 102 may be configured to communicate a transaction signature request to the token database 108. In some embodiments, the transaction signature request may include an indication for the token database 108 to generate a transaction signature related to the transfer of crypto-tokens. In these or other embodiments, the generation of the transaction signature may be based on the transaction information included in the token transaction request.

For example, at operation 308, in response to receiving the transaction signature request and based on the transaction information included therein, at operation 306, the token database 108 may generate the transaction signature. For instance, the transaction information may indicate a transfer of crypto-token ownership from a first entity to a second entity. The first entity may be the master entity and the second entity may be a particular associate entity in instances in which one or more crypto-tokens are awarded to the particular associate entity. Alternatively, the first entity may be the particular associate entity and the second entity may be the master entity in instances in which one or more crypto-tokens are used by the particular associate entity to purchase goods or services from the master entity. Additionally or alternatively, the first entity may be a first associate entity and the second entity may be a second associate entity in instances in which the first associate entity is transferring assignment of crypto-tokens to the second associate entity.

The transaction signature may be an indication of transfer of crypto-tokens from a first wallet of the first entity to a second wallet of the second entity associated with the transaction. Additionally or alternatively, the transaction signature may be used to securely verify that the first entity indicated in the transaction information is in fact the entity that transfers the crypto-tokens.

For example, based on the transaction information, the token database 108 may be configured to access the first wallet of the first entity. The token database 108 may be configured to generate a data entry that includes transaction details about the transaction based on the transaction information. For example, the transaction details may indicate the transfer of a particular number of crypto-tokens, as indicated by the transaction information, from the first wallet of the first entity to an address of the second entity that is associated with the second wallet of the second entity. In some embodiments, the address of the second entity may be the public key of the second entity. In some embodiments, the token database 108 may be configured to "sign" the transaction details with the private key of the first entity stored in the first wallet. The signing of the transaction details may include encrypting the transaction details with the private key of the first entity in which the encrypted transaction details entail the generated token signature. The generated token signature may only be decrypted using the public key of the first entity. Given that the public key of the first entity is known to be associated with the first entity and that the private key of the first entity is kept secret by the token database 108 and only accessed by the token database as indicated in secured transaction information, it may be validated that the token signature and the contents included therein were authorized by the first entity and not another entity.

At operation 310, the token database 108 may communicate the transaction signature to the blockchain manager 102. At operation 312, in response to receiving the transaction signature, the blockchain manager 102 may communication the transaction signature to the blockchain nodes 106.

At operation 314, in response to receiving the transaction signature, the blockchain nodes 106 may validate the transaction. For example, the transaction signature may include an unencrypted indication that the transaction associated with the transaction signature includes a transfer of crypto-tokens owned by the first entity. In addition, the blockchain nodes 106 may have access to all of the public keys of the entities (e.g., as received from the blockchain manager 102 and/or the token database 108). The blockchain nodes 106 may access the public key of the first entity in response to the unencrypted indication and may attempt to decrypt the transaction signature with the public key of the first entity. In response to being able to decrypt the transaction signature with the public key of the first entity, the blockchain nodes 106 may verify that the transaction was authorized by the first entity.

In these or other embodiments, the blockchain nodes 106 may validate the transaction by verifying that the first entity owns at least the number of crypto-tokens included in the transaction. For example, based on the blockchain record of the private blockchain, the blockchain nodes may identify all transactions where the first entity was a party, whether the first entity received or assigned crypto-tokens, and the number of crypto-tokens involved in each transaction. Based on such identified information, the blockchain nodes 106 may be able to determine how many crypto-tokens the first entity owns and may compare that number to the number of crypto-tokens indicated in the decrypted signature. In response to the determined number of crypto-tokens owned by the first entity being greater than the number of crypto-tokens indicated in the decrypted signature, the blockchain nodes 106 may determine that the transaction is valid. In some embodiments, the determination that the transaction is valid may be in response to at least a majority of the blockchain nodes 106 determining that the transaction is valid.

In some embodiments, the private blockchain may be updated at operation 316 in response to the transaction being validated. For example, a particular blockchain node 106 may be configured to generate a new block of the private blockchain in response to the transaction being validated. In these or other embodiments, the generation of the new block may be triggered by the validation of the transaction. Additionally or alternatively, the generation of the new block may be independent of or omit the solving of a hard puzzle. The omitting of having to solve a hard puzzle may result in a new block being generated almost immediately after a transaction is validated. Additionally or alternatively, the omitting of having to solve a hard puzzle may result in most (if not all blocks) including only one transaction unless two transactions are validated at exactly the same time.

In contrast, public blockchains often include many independent nodes (often referred to as "miners") that validate multiple transactions and include the multiple transactions in potential blocks. Additionally, the potential blocks generated by different miners may include different transactions. The miners typically compete to see whose block is added to the public blockchain by attempting to solve a puzzle associated with their respective blocks. The reward for solving the puzzle is typically the awarding of one or more public crypto-tokens associated with the public blockchain to the winning miner. The above methodology is typically used to provide incentives for a distributed network of independent miners to maintain the public blockchain. However, the above methodology also may result in delay of transfer of the associated public crypto-tokens. Additionally, the above methodology may result in each block of the public blockchain having added complexity due to each block including multiple transactions.

In contrast, the automatic generation of a block as triggered by validation of a transaction instead of solving of a puzzle may increase the speed at which transactions may be approved and settled. In addition, the reduced complexity of each block may help allow for faster and easier access to the data stored on each block.

In some embodiments, the particular blockchain node 106 may generate the new block as a data entry of the blockchain record based on the transaction information included in the transaction signature. For instance, the new block may include, as an entry of the blockchain record, data indicating that the number of crypto-tokens indicated in the transaction signature were transferred from the first entity to the second entity. In these or other embodiments, generation of the new block may include a timestamp associated with the time that the new block was created.

In these or other embodiments, the generation of the new block may include the generation of a hash based on the previous block. For example, the particular blockchain node 106 that generates the new block may apply a hash function to the previous block to obtain a hash that represents the information included in the previous block. Additionally or alternatively, the particular blockchain node 106 may apply the hash function to two or more previous blocks or the entire blockchain to obtain the hash. The obtained hash may be included in the new block and may be used as a way to help maintain the integrity of the private blockchain as discussed above.

In some embodiments, in response to the transaction being validated and the blockchain being updated, one or more of the blockchain nodes 106 may communicate a confirmation of the validation to the blockchain manager 102 at operation 318. At operation 320, the blockchain manager 102 may be configured to communicate the received validation confirmation to the token database 108. In these or other embodiments, the blockchain manager 102 may be configured to include with the validation confirmation, the details regarding context to the transaction that may have been received at operation 304 as part of the transaction information. For instance, the details may include a purpose for the transaction, goods or services involved in the transaction, etc.

At operation 322, the token database 108 may update in response to receiving the validation confirmation. For instance, the token database 108 may update the database record to indicate the transfer of crypto-tokens from the first entity to the second entity. In some embodiments, the database record may be updated to indicate the reason for the transaction, the goods or services involved, etc. based on the received details.

Additionally or alternatively, a first token balance of the first wallet of the first entity may be updated based on the particular amount of crypto-tokens being transferred from the first entity. Moreover, a second token balance of the second wallet of the second entity may be updated based on the particular amount of crypto-tokens being transferred to the second entity.

In some embodiments, at operation 324, the blockchain manager 102 may communicate the validation confirmation to the user portal 104. At operation 326, the user portal 104 may be configured to publish transaction information on a newsfeed. In some embodiments, the user portal 104 may publish the transaction information in response to receiving the validation confirmation. In these or other embodiments, the publishing of the transaction information may indicate the parties involved in the transaction, the reason for the transaction, the subject of the transaction (e.g., the goods or services involved in the transaction), the number of crypto-tokens exchanged during the transaction, or any combination thereof. In some embodiments, the newsfeed may be made available to the associate entities via a user interface presented on displays of devices used by the associate entities in relation to association of the associated entities with the master entity. For example, the newsfeed may be presented on computers of the master entity that are used by the associate entities as part of employment with the master entity.

Modifications, additions, or omissions may be made to the operations 300 without departing from the scope of the present disclosure. For example, in some embodiments, the operations 300 may be arranged in a different order or performed at the same time. In addition, one or more operations may be performed by different components or elements than as described.

In these or other embodiments, the operations 300 may include one or more additional operations. For instance, in some embodiments, the operations 300 may include operation 328 at which the token database 108 may validate the transaction using the transaction signature and the database record in a manner similar to the blockchain nodes 106 validating the transaction at operation 314.

Additionally or alternatively, one or more operations of the operations 300 may be used to reconstruct the private blockchain in some embodiments. For example, the private blockchain may become corrupted through the blockchain nodes 106 malfunctioning or a malicious entity infiltrating enough blockchain nodes 106 to change the private blockchain. In some embodiments, the blockchain manager 102 may be configured to obtain the database record from the token database 108. In these or other embodiments, the blockchain manager 102 may be configured to use the database record to direct the reconstruction of the private blockchain using one or more operations of the operations 300 and/or 200.

For example, in some embodiments, operations 212 and 214 may be performed to recreate the first block of the private blockchain. In these or other embodiments, using the database record, and starting from the first entry of the database record that corresponds to the first transaction (e.g., as indicated by timestamps included in the database record), the first entry may be used to generate transaction information that may be used to create the next block in the private blockchain, such as described with respect to operation 316. The next entry in the database record may be used to generate the next block and so forth until the entire private blockchain has been recreated. The reconstruction of the private blockchain in this manner may be much faster and easier than if the private blockchain were created in a traditional manner using the solving of puzzles due to the omission of such a step. Additionally, the inclusion of typically only one transaction per block may further facilitate reconstructing the private blockchain by removing variability in the number and order of transactions included in each block. For example, the tracing through transactions may be simplified by avoiding the need to filter through the contents of particular blocks to find transactions related to a particular account. As such, the configuration of management of the private blockchain as described may help solve one or more problems associated with potential corruption of a private blockchain such that implementation of private blockchains may have fewer security issues.

In some embodiments, the operations 300 may include one or more additional operations related to the reconstruction of the database record in some instances. For example, the database record and/or wallets may become corrupted through the token database 108 malfunctioning or a malicious entity infiltrating the token database. In some embodiments, the blockchain manager 102 may be configured to request the private blockchain from the blockchain nodes 106 at an operation 328 of the operations 300. At an operation 330, the blockchain nodes 106 may return the private blockchain to the blockchain manager 102.

In these or other embodiments, the blockchain manager 102 may be configured to use the private blockchain to direct the reconstruction of data of the token database 108 at operation 332. For example, starting from the first block in the private blockchain, the blockchain manager 102 may direct that each transaction be added to the database record in sequential order. In these or other embodiments, the blockchain manager 102 may sequentially move through each block of the blockchain to obtain the sequential order of transactions.

In these or other embodiments, the blockchain manager 102 may be configured to instruct that the token balances in each wallet be set as indicated in the first block of the private blockchain. The blockchain manager 102 may be configured to direct the updating of applicable token balances based on each block. As such, the blockchain manager 102 may be configured to establish the proper token balances by walking through each block and the corresponding transaction. In these or other embodiments, the obtained private blockchain may be used to verify whether the token balances in the wallets are correct or have been corrupted. Additionally, the inclusion of typically only one transaction per block may facilitate reconstructing data stored in the token database 108 by removing variability in the number and order of transactions included in each block such that processing related to filtering the contents of a particular block according to a particular account (e.g., wallet) may be reduced or omitted.

The operations 300 of FIG. 3 and corresponding components (e.g., the blockchain manager 102, the user portal 104, the blockchain nodes 106, and the token database 108) may also help facilitate the use and exchange of crypto-tokens between entities. For instance, rather than requiring that the entities maintain their own wallets and have devices that are able to interact with the blockchain nodes 106, the user portal 104, the blockchain manager 102, and the token database 108 and associated operations may handle such operations on behalf of the entities. As such, the blockchain technology is improved by improving management of blockchains in a way that allows entities to more easily use blockchain technology.

Figure 4:
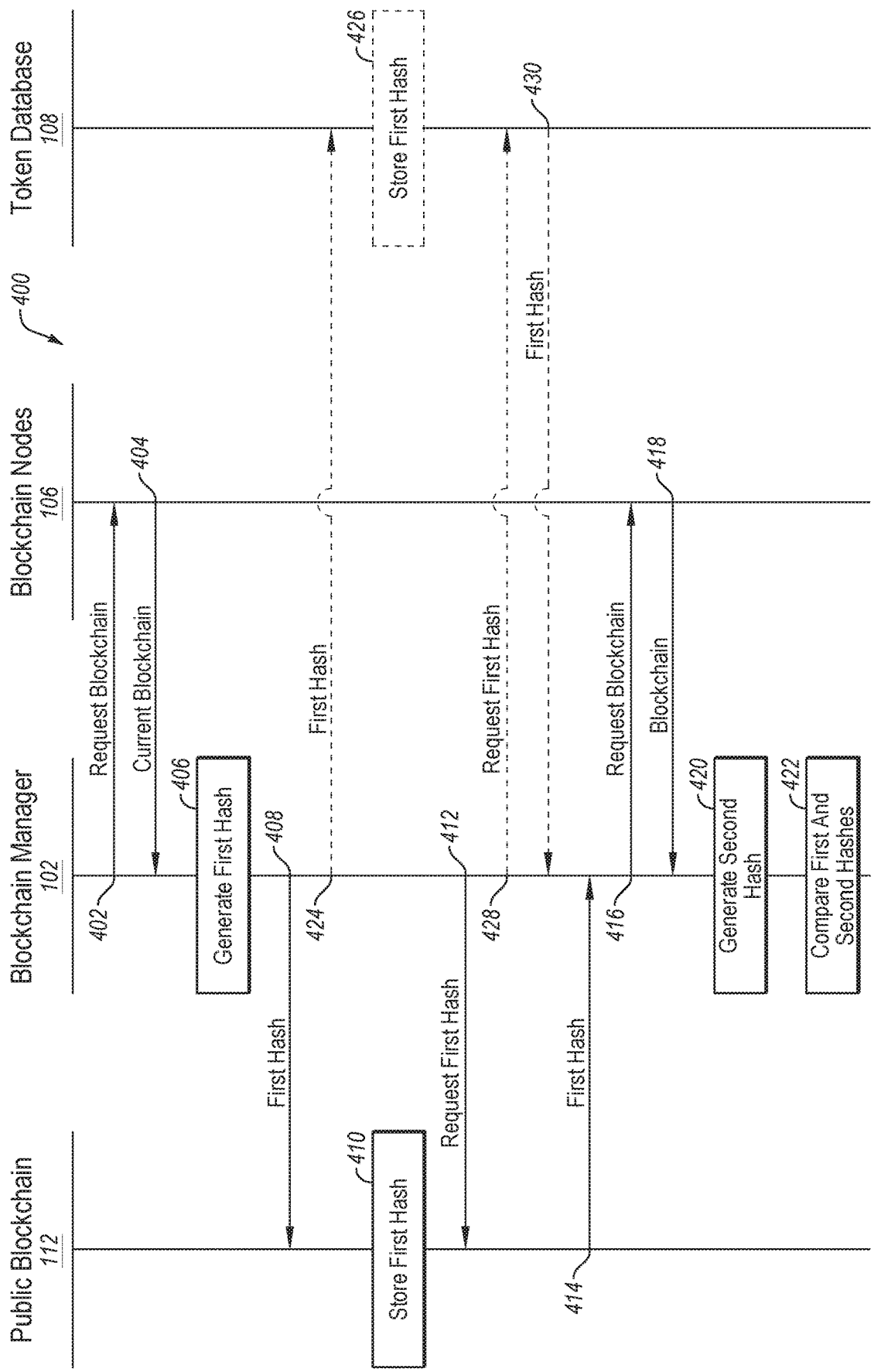
FIG. 4 illustrates example operations related to validation of a private blockchain.

FIG. 4 illustrates example operations 400 related to validation of the private blockchain. The operations 400 may be arranged in accordance with at least one embodiment described in the present disclosure. In the illustrated example, the operations 400 may be between the blockchain manager 102, the public blockchain 112, the token database 108, and the blockchain nodes 106 of FIG. 1. In some embodiments, the operations 400 may be an example of communications and interactions between the blockchain manager 102, the public blockchain 112, the token database 108, and the blockchain nodes 106. The operations 400 illustrated are not exhaustive but are merely representative of operations that may occur. Furthermore, one operation as illustrated may represent one or more communications, operations, and/or data exchanges. In addition, the components or elements described as performing a specific operation may vary depending on particular implementations.

At operation 402, the blockchain manager 102 may request the current version of the private blockchain from the blockchain nodes 106. In some embodiments, the blockchain manager 102 may request the current version in response to a new block of the private blockchain being created, such as described above with respect to operations 200 and 300 of FIGS. 2 and 3, respectively. At operation 404, one or more of the blockchain nodes 106 may communicate a copy of the current version of the private blockchain to the blockchain manager 102 in response to the request.

At operation 406, the blockchain manager 102 may generate a first hash of the received version of the private blockchain. In some embodiments, the first hash may be generated by applying a hash function to one or more blocks of the private blockchain. For example, in some embodiments, the hash function may be applied to the newest block of the private blockchain. As discussed above, the newest block may include a hash of the previous block, which may include a hash of its preceding block, and so forth. As such, in some embodiments, a hash of the newest block may represent the entire private blockchain. Additionally or alternatively, the blockchain manager 102 may apply the hash function to multiple blocks of the private blockchain. In these or other embodiments, the blockchain manager may apply the hash function to the entire private blockchain.

At operation 408, the blockchain manager 102 may communicate the first hash to the public blockchain 112. In some embodiments, the first hash may be communicated to the public blockchain 112 such that the first hash is included in the public blockchain 112. For example, in some embodiments, the public blockchain 112 may incorporate the use of public contracts that may be entered in the public blockchain 112. In these or other embodiments, the first hash may be included in a particular smart contract and the particular smart contract. Additionally or alternatively, the particular smart contract may be communicated to the public blockchain 112 with the first hash included therein. At operation 410, the public blockchain 112 may store the first hash in a block of the public blockchain 112 in response to receiving the first hash at operation 408.

In some embodiments, to validate the private blockchain at a later time, the blockchain manager 102 may request the first hash from the public blockchain 112. In some embodiments, the request may include information related to the addition of the first hash to obtain the first hash. For example, the request may include an address used to add the first hash to the public blockchain 112, a hash of the transaction used to add the first hash, a hash of the smart contract used to add the first hash, or any other suitable technique.

In response to the request, the public blockchain 112 may retrieve the first hash and communicate the first hash to the blockchain manager 102 at operation 414. As discussed above, the nature of the public blockchain 112 is such that the chances that the first hash as entered in the public blockchain 112 has been compromised may be very low. As such, the blockchain manager 102 may have a large degree of confidence that the first hash is an accurate representation of the private blockchain as received at operation 404.

At operation 416, the blockchain manager 102 may request a version of the private blockchain. The blockchain manager 102 may request the same version of the private blockchain that was received at operation 404. For example, between operations 404 and 416, one or more blocks may have been added to the private blockchain. As such, at operation 416, the blockchain manager 102 may request the version of the private blockchain that does not include the blocks that were added between operations 404 and 416. In some embodiments, the timestamps associated with the blocks may be used to identify matching versions of the private blockchain.

At operation 420, the blockchain manager 102 may generate a second hash based on the version of the private blockchain received at operation 418. The second hash may be generated in the same manner that the first hash was generated to allow for an accurate comparison between hashes.

At operation 422, the blockchain manager 102 may compare the first hash against the second hash. Due to the first hash and the second hash being generated in the same manner and with respect to the same version of the private blockchain, the first hash and the second hash should match if the private blockchain has not been changed or tampered with. As such, at operation 422, the validity of the private blockchain may be verified in response to the first hash and the second hash matching. In contrast, the private blockchain may be determined as being compromised in response to the first hash and the second hash not matching. As such, the operations 400 may be used to validate the private blockchain to address one or more security vulnerabilities that may be associated with private blockchains that may not be associated with public blockchains.

Modifications, additions, or omissions may be made to the operations 400 without departing from the scope of the present disclosure. For example, in some embodiments, the operations 400 may be arranged in a different order or performed at the same time. In addition, one or more operations may be performed by different components or elements than as described.

In these or other embodiments, the operations 400 may include one or more additional operations. For instance, in some embodiments, the operations 400 may include operation 424 at which the blockchain manager 102 may send the first hash to the token database 108. At operation 426, the first hash may be stored in the token database 108 in response to being received from the blockchain manager 102. In these or other embodiments, the first hash may be requested by the blockchain manager 102 from the token database 108 at operation 428. In response to the request of operation 428, the token database 108 may communicate the first hash back to the blockchain manager 102. In these or other embodiments, the first hash received from the token database 108 may be compared against the second hash in addition to or in place of the first hash as received from the public blockchain 112.

Figure 5:
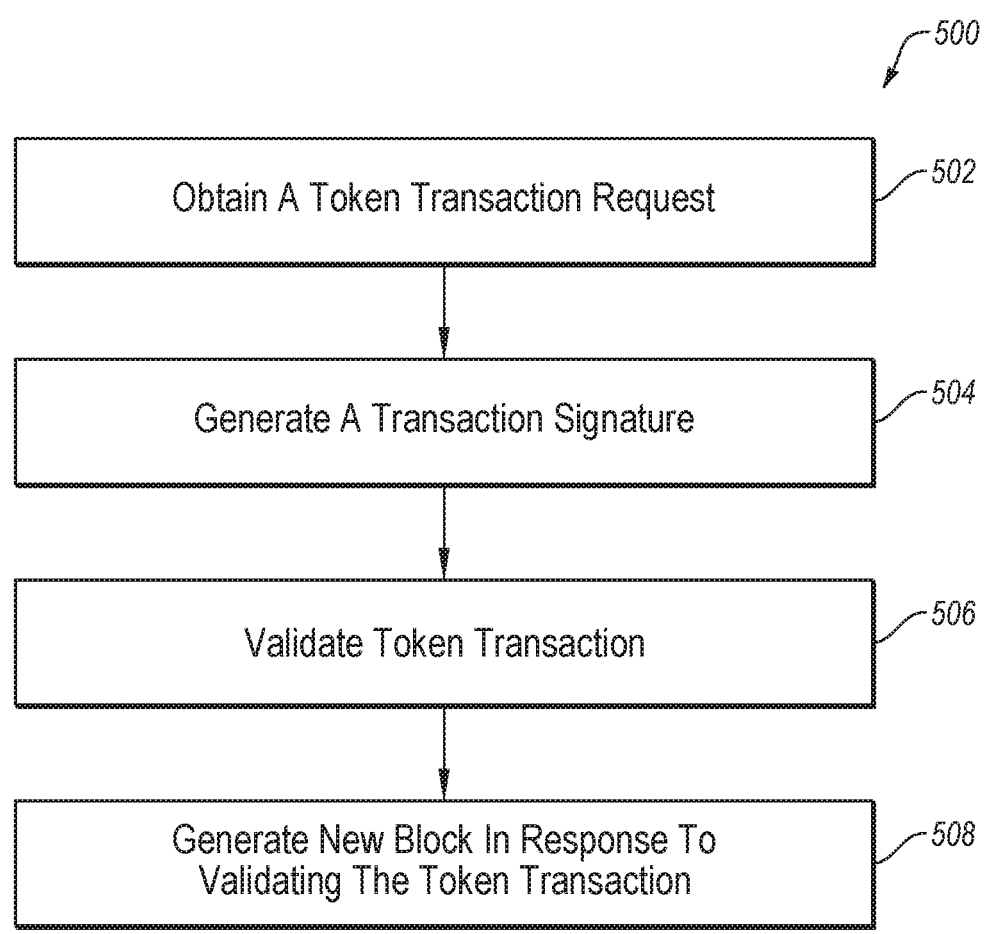
FIG. 5 is a flowchart of an example method to manage a blockchain.

FIG. 5 is a flowchart of an example method to manage a blockchain. The method 500 may be arranged in accordance with at least one embodiment described in the present disclosure. One or more of the operations of the method 500 may be performed, in some embodiments, by a device or system, such as one or more elements of the blockchain management system 100 of FIG. 1. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 500 may include block 502, at which a token transaction request may be obtained. The token transaction request may be a request of a token transaction that includes a transfer of assignment of a crypto-token of a crypto-medium from a first entity to a second entity. The token transaction request may be a request to initiate the token transaction. In some embodiments, token transaction request may be based on transaction initialization information such as that described above with respect to operation 302 of operations 300. In these or other embodiments, the token transaction request described above with respect to operation 304 of the operations 300 may be an example of the token transaction request obtained at block 502.

At block 504, a transaction signature may be generated in response to obtaining the token transaction request. In some embodiments, the transaction signature may be generated based on one or more of the operations 306 and 308 described with respect to the operations 300.

At block 506, the token transaction may be validated. In some embodiments, the token transaction may be validated using the digital signature and one or more blocks of a private blockchain that includes a blockchain record of all transactions of the crypto-medium. In some embodiments, the token transaction may be validated based on one or more of the operations 310, 312, and 314 described with respect to the operations 300.

At block 508, a new block of the private blockchain may be generated. In some embodiments, the new block may be generated in response to validation of the token transaction such that the validation of the token transaction triggers generation of the new block. In these or other embodiments, the generation may be independent of or omit the solving of a puzzle.

Modifications, additions, or omissions may be made to the method 500 without departing from the scope of the present disclosure. For example, some of the operations of method 500 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

For example, in some embodiments, the method 500 may include operations related to initialization of the private blockchain. For example, the method 500 may include operations related to mining every crypto-token at initialization of the private blockchain, such as discussed above with respect to operations 200. Additionally or alternatively, the method 500 may include operations related to storing assignment of all the pre-mined tokens in a master wallet at initialization of the private blockchain, such as discussed above with respect to operations 200. In some embodiments, the first wallet may be the master wallet and the token transaction may be the first token transaction of the crypto-medium that occurs after initialization of the private blockchain.

As another example, in some embodiments, the method 500 may include operations related to obtaining confirmation of the validation of the token transaction and updating a database record of a token database accordingly, such as described above with respect to the operations 300.

In these or other embodiments, the method 500 may include reconstructing data stored in the token database using the private blockchain by sequentially moving through every block of the private blockchain in which each block indicates only one transaction, such as described above with respect to the operations 300. Additionally or alternatively, the method 500 may include reconstructing the private blockchain using the database record. In these or other embodiments, the reconstructing of the private blockchain may include sequentially recreating each block of the private blockchain based on each transaction included in the database record starting from the earliest transaction in which a new block is created for each transaction, such as discussed above with respect to the operations 300.

In these or other embodiments, the method 500 may include one or more operations related to validating the private blockchain. For example, in some embodiments, the method 500 may include one or more operations related to applying a hash function to the new block to generate a hash based on the new block of the private blockchain, communicating the hash to a public blockchain such that the hash is included in the public blockchain, and validating the private blockchain based on the hash as included in the public blockchain, such as described above with respect to the operations 400.

Figure 6:
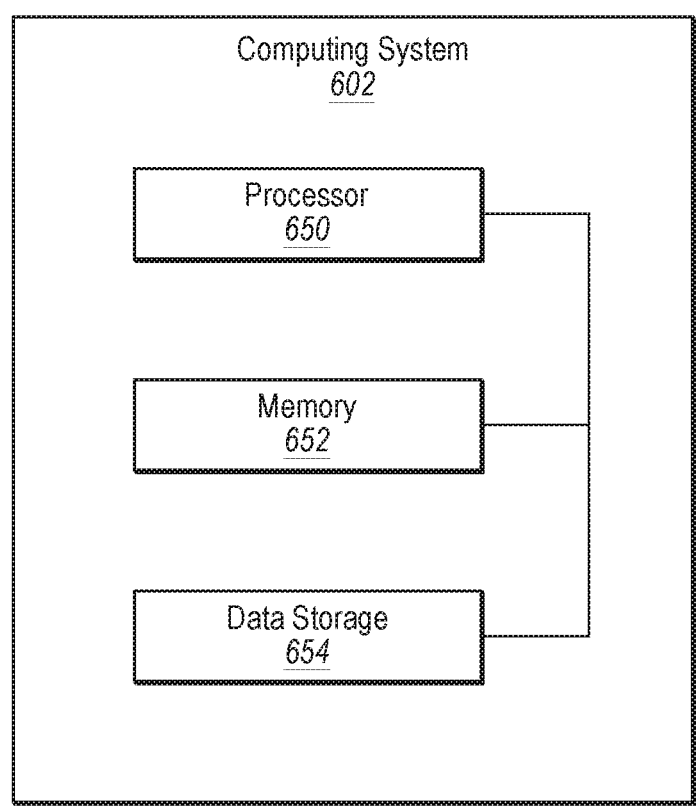
FIG. 6 illustrates a block diagram of an example computing system, all arranged according to one or more embodiments described in the present disclosure.

FIG. 6 illustrates a block diagram of an example computing system 602. The computing system 602 may be configured according to at least one embodiment of the present disclosure and may be an example of computing systems that may include or be part of one or more elements of the blockchain management system 100 of FIG. 1. The computing system 602 may include a processor 650, a memory 652, and a data storage 654. The processor 650, the memory 652, and the data storage 654 may be communicatively coupled.

In general, the processor 650 may include any suitable special-purpose or general-purpose computer, computing entity, or processing device including various computer hardware or software modules and may be configured to execute instructions stored on any applicable computer-readable storage media. For example, the processor 650 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 6, the processor 650 may include any number of processors configured to, individually or collectively, perform or direct performance of any number of operations described in the present disclosure. Additionally, one or more of the processors may be present on one or more different electronic devices, such as different servers.

In some embodiments, the processor 650 may be configured to interpret and/or execute program instructions and/or process data stored in the memory 652, the data storage 654, or the memory 652 and the data storage 654. In some embodiments, the processor 650 may fetch program instructions from the data storage 654 and load the program instructions in the memory 652. After the program instructions are loaded into memory 652, the processor 650 may execute the program instructions.

For example, in some embodiments, the blockchain manager 102 of FIG. 1 may be a software application that may be included in the data storage 654 as program instructions. The processor 650 may fetch the program instructions from the data storage 654 and may load the program instructions in the memory 652. After the program instructions of the blockchain manager 102 are loaded into memory 652, the processor 650 may execute the program instructions such that the computing system 602 may perform or direct the performance of the operations associated with the blockchain manager 102 as directed by the instructions. Similar operations may occur with respect to one or more other elements described with respect to the blockchain management system 100 of FIG. 1.

The memory 652 and the data storage 654 may include computer-readable storage media for carrying or having computer-executable instructions or data structures stored thereon. Such computer-readable storage media may include any available media that may be accessed by a general-purpose or special-purpose computer, such as the processor 650. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store program code in the form of computer-executable instructions or data structures and which may be accessed by a general-purpose or special-purpose computer. In these and other embodiments, the term "non-transitory" as explained herein should be construed to exclude only those types of transitory media that were found to fall outside the scope of patentable subject matter in the Federal Circuit decision of *In re Nuijten,* 500 F.3d 1346 (Fed. Cir. 2007). Combinations of the above may also be included within the scope of computer-readable media.

Modifications, additions, or omissions may be made to the computing system 602 without departing from the scope of the present disclosure. For example, in some embodiments, the computing system 602 may include any number of other components that may not be explicitly illustrated or described.

As indicated above, the embodiments described in the present disclosure may include the use of a special purpose or general purpose computer (e.g., the processor 650 of FIG. 6) including various computer hardware or software modules, as discussed in greater detail below. Further, as indicated above, embodiments described in the present disclosure may be implemented using computer-readable media (e.g., the memory 652 or data storage 654 of FIG. 6) for carrying or having computer-executable instructions or data structures stored thereon.

In some embodiments, the different components, modules, engines, and services described herein may be implemented as objects or processes that execute on a computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used in the present disclosure to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
   obtaining, at a blockchain manager of a private blockchain that is associated with a master entity, a request to initiate a token transaction that includes a transfer of assignment of a crypto-token of a crypto-medium from a first entity to a second entity, wherein the private blockchain includes a blockchain record of a plurality of transactions of the crypto-medium;
   maintaining, by a token database, key information associated with a plurality of entities, wherein the key information includes a first private key associated with the first entity, and wherein the token database maintains the key information such that the first private key is not accessible to a plurality of blockchain nodes used to validate the plurality of transactions of the crypto-medium;
   generating, by the token database, a transaction signature for the token transaction, wherein the transaction signature includes transaction details, for the token transaction, that have been encrypted by the token database using the first private key associated with the first entity;
   validating, by one or more of the plurality of blockchain nodes, the token transaction based on the transaction signature, including by:
   decrypting at least a portion of the transaction signature using a first public key associated with the first entity; and
   in response to the decrypting to validate the token transaction, generating, by the one or more blockchain nodes, a new block for the private blockchain, wherein the new block includes an update, to the blockchain record for the private blockchain, that indicates at least a portion of the transaction details.

2. The method of claim 1, further comprising:
   mining a plurality of crypto-tokens at an initialization of the private blockchain; and
   storing assignment of the plurality of crypto-tokens in a master wallet at the initialization of the private blockchain, wherein the token transaction is a first token transaction of the crypto-medium that occurs after initialization of the private blockchain.

3. The method of claim 1, further comprising:
   detecting that the token database has been corrupted; and
   in response to the detecting, reconstructing data stored in the token database using the private blockchain by sequentially moving a series of blocks of the private blockchain.

4. The method of claim 3, wherein the reconstructed data includes one or more data portions selected from a list of data portions consisting of: a first token balance of a first wallet of the first entity stored on the token database and a second token balance of a second wallet of the second entity stored on the token database.

5. The method of claim 1, wherein the new block for the private blockchain includes the token transaction and no other token transactions.

6. The method of claim 1, further comprising:
   applying a hash function to the new block to generate a hash based on the new block of the private blockchain;
   communicating the hash to a public blockchain such that the hash is included in the public blockchain; and
   validating the private blockchain based on the hash as included in the public blockchain.

7. The method of claim 6, wherein applying the hash function to the new block includes applying the hash function to the new block and one or more other blocks of the private blockchain.

8. The method of claim 6, wherein applying the hash function to the new block includes applying the hash function only to the new block.

9. The method of claim 6, further comprising:
   generating a smart contract that is used by the public blockchain in which the smart contract includes the hash,
   wherein communicating the hash to the public blockchain includes communicating the smart contract to the public blockchain.

10. The method of claim 1, further comprising:
    in response to detecting that the private blockchain is corrupted, reconstructing the private blockchain, including by sequentially recreating each block of the private blockchain based on each transaction starting from an earliest transaction in which a new block is created for each transaction.

11. A system, comprising:
    a token database configured to store:
    a database record related to transactions conducted with respect to a crypto-medium associated with a private blockchain, wherein the private blockchain is associated with a master entity and includes a blockchain record of a plurality of transactions of the crypto-medium; and
    a first wallet of a first entity, wherein the first wallet includes a first private key of the first entity, a first public key of the first entity, and a first token balance of crypto-tokens of the crypto-medium owned by the first entity, wherein the token database maintains the first wallet such that the first private key is not accessible to a plurality of blockchain nodes used to validate the plurality of transactions of the crypto-medium;

one or more processors; and one or more non-transitory, computer-readable media containing instructions which, when executed by the one or more processors, cause the system to perform operations comprising:

obtaining a request to initiate a token transaction that includes a transfer of assignment of a crypto-token from the first entity to a second entity;

generating, by the token database, a transaction signature for the token transaction, including by encrypting, using the first private key of the first entity, transaction details that indicate the transfer of assignment of the crypto-token from the first entity to the second entity;

validating, by one or more of the plurality of blockchain nodes, the token transaction using the transaction signature, including by decrypting at least a portion of the transaction signature using the first public key of the first entity; and subsequent to the decrypting to validate the token transaction, generating a new block for the private blockchain, wherein the new block includes an update, to the blockchain record, that indicates the transaction details.

12. The system of claim 11, wherein the operations further comprise:

obtaining, from at least one of the one or more blockchain nodes, confirmation of the validation of the token transaction; and directing the token database to update the database record based on the updated blockchain record in response to obtaining confirmation of the validation of the token transaction.

13. The system of claim 11, wherein the operations further comprise:

mining a plurality of crypto-tokens at an initialization of the private blockchain; and storing assignment of the plurality of crypto-tokens in a master wallet at initialization of the private blockchain, wherein the first wallet is the master wallet and the token transaction is a first token transaction of the crypto-medium that occurs after initialization of the private blockchain.

14. The system of claim 11, wherein the operations further comprise:

applying a hash function to the new block to generate a hash based on the new block of the private blockchain;

communicating the hash to a public blockchain such that the hash is included in the public blockchain; and validating the private blockchain based on the hash as included in the public blockchain.

15. The system of claim 14, wherein applying the hash function to the new block includes applying the hash function to the new block and one or more other blocks of the private blockchain.

16. The system of claim 14, wherein the new block for the private blockchain includes the token transaction and no other token transactions.

17. One or more non-transitory, computer-readable media including instructions which, when executed by one or more processors, cause a system to perform operations comprising:

obtaining, for a private blockchain that is associated with a master entity, a request to initiate a token transaction that includes a transfer of assignment of a crypto-token of a crypto-medium from a first entity to a second entity, wherein the private blockchain includes a blockchain record of a plurality of transactions of the crypto-medium;

maintaining, by a token database of the system, key information associated with a plurality of entities, wherein, for the first entity, the key information includes:

a first public key that is accessible to a plurality of blockchain nodes used to validate the plurality of transactions of the crypto-medium; and a first private key that is accessible only by the token database;

generating, by the token database, a transaction signature for the token transaction, including by encrypting, using the first private key of the first entity, transaction details associated with the transfer of assignment of the crypto-token from the first entity to the second entity;

validating, by one or more of the plurality of blockchain nodes, the token transaction based on the transaction signature, including by decrypting at least a portion of the transaction signature using the first public key of the first entity; and in response to the decrypting to validate the token transaction, generating, by the one or more blockchain nodes, a new block for the private blockchain, wherein the new block includes an update, to the blockchain record, that indicates at least a portion of the transaction details.

18. The computer-readable media of claim 17, wherein the operations further comprise:

mining a plurality of crypto-tokens at an initialization of the private blockchain; and storing assignment of the plurality of crypto-tokens in a master wallet at initialization of the private blockchain, wherein the token transaction is a first token transaction of the crypto-medium that occurs after the initialization of the private blockchain.

19. The method of claim 1, wherein the generating the new block does not require the one or more blockchain nodes to perform a proof-of-work consensus operation; and wherein the plurality of transactions of the crypto-medium are each represented in the private blockchain using separate blocks.

20. The computer-readable media of claim 17, wherein the new block for the private blockchain includes the token transaction and no other token transactions.

* * * * *